United States Patent
Gordon et al.

(10) Patent No.: US 10,776,519 B2
(45) Date of Patent: Sep. 15, 2020

(54) INFORMATION PRESENTATION MANAGEMENT

(71) Applicant: International Business Machines Corporation, Armonk, NY (US)

(72) Inventors: Itai Gordon, Jerusalem (IL); Peter Hagelund, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 15/230,843

(22) Filed: Aug. 8, 2016

(65) Prior Publication Data

US 2018/0039793 A1 Feb. 8, 2018

(51) Int. Cl.
G06F 21/62 (2013.01)
G06Q 30/04 (2012.01)

(52) U.S. Cl.
CPC ........ G06F 21/629 (2013.01); G06F 21/6245 (2013.01); *G06F 21/6209* (2013.01); *G06F 21/6254* (2013.01); *G06F 2221/2111* (2013.01); *G06F 2221/2139* (2013.01); *G06Q 30/04* (2013.01)

(58) Field of Classification Search
None
See application file for complete search history.

(56) References Cited

U.S. PATENT DOCUMENTS

| 5,801,697 | A | 9/1998 | Parikh et al. | |
|---|---|---|---|---|
| 8,600,110 | B1 * | 12/2013 | Chan | G06F 21/32 382/103 |
| 8,966,656 | B2 | 2/2015 | Hirsch et al. | |
| 9,104,886 | B1 * | 8/2015 | Dolbakian | G06F 21/62 |
| 9,977,909 | B1 * | 5/2018 | Austin | G06F 3/04883 |
| 2005/0086069 | A1 * | 4/2005 | Watson | H04N 21/4508 726/3 |
| 2006/0028488 | A1 * | 2/2006 | Gabay | H04L 29/06027 345/626 |
| 2009/0070881 | A1 * | 3/2009 | Yellepeddy | G06F 21/6245 726/26 |

(Continued)

FOREIGN PATENT DOCUMENTS

WO  2011088579 A1  7/2011

OTHER PUBLICATIONS

International Business Machines Corporation; "IBM InfoSphere Guardium Data Redaction"; Jul. 2012.

(Continued)

*Primary Examiner* — Christopher C Harris
(74) *Attorney, Agent, or Firm* — Anthony M. Pallone

(57) ABSTRACT

Disclosed aspects relate to information presentation management by an electronic presentation device. With respect to a set of information for presentation, a set of information profile data is detected. Using a set of sensors linked to the electronic presentation device, a set of device sensor data of the electronic presentation device is collected. Based on both the set of device sensor data and the set of information profile data, a determination of a security configuration for presentation of the set of information on the electronic presentation device is made. Based on the security configuration, the set of information is presented by the electronic presentation device.

20 Claims, 6 Drawing Sheets

(56) References Cited

U.S. PATENT DOCUMENTS

| | | | | |
|---|---|---|---|---|
| 2009/0141895 A1* | 6/2009 | Anderson | G06F 21/84 | 380/252 |
| 2010/0266162 A1* | 10/2010 | Singh | G06F 3/011 | 382/103 |
| 2012/0011559 A1* | 1/2012 | Miettinen | G06F 21/31 | 726/1 |
| 2012/0116937 A1* | 5/2012 | Van Biljon | G06Q 30/04 | 705/34 |
| 2013/0326578 A1* | 12/2013 | Blom | G06F 21/6218 | 726/1 |
| 2014/0047560 A1* | 2/2014 | Meyer | G06F 21/62 | 726/28 |
| 2014/0143149 A1 | 5/2014 | Aissi | | |
| 2014/0196158 A1 | 7/2014 | Buck | | |
| 2014/0201844 A1* | 7/2014 | Buck | G06F 21/50 | 726/26 |
| 2015/0067717 A1* | 3/2015 | Oliver | H04N 21/4542 | 725/28 |
| 2015/0113666 A1* | 4/2015 | Buck | G06F 21/50 | 726/28 |
| 2016/0070344 A1* | 3/2016 | Gohl | G06F 3/013 | 345/156 |
| 2016/0087952 A1 | 3/2016 | Tartz et al. | | |
| 2016/0162679 A1* | 6/2016 | Lin | G06F 21/36 | 726/28 |
| 2016/0188973 A1* | 6/2016 | Ziaja | G06F 21/84 | 382/116 |
| 2016/0246979 A1* | 8/2016 | Rakshit | G06F 21/6218 | |
| 2016/0283741 A1* | 9/2016 | Lin | G06F 21/6218 | |
| 2016/0294823 A1* | 10/2016 | McKeithan, II | G06F 3/017 | |
| 2016/0378999 A1* | 12/2016 | Panchapakesan | G06F 21/6254 | 726/26 |

OTHER PUBLICATIONS

International Business Machines Corporation; "IBM InfoSphere Optim Data Masking solution"; Oct. 2012.

* cited by examiner

INFORMATION PRESENTATION MANAGEMENT

BACKGROUND

This disclosure relates generally to computer systems and, more particularly, relates to information presentation management. Information presentation management may be desired to be performed as efficiently as possible. The amount of data that needs to be managed with respect to information presentation is increasing. Management of information presentation by an electronic presentation device may be desired to be performed as efficiently as possible. As data needing to be managed increases, the need for management efficiency may increase.

SUMMARY

Aspects of the disclosure relate to configuring a dynamic privacy policy on a mobile device based on information from mobile device sensors. Disclosed aspects may determine when to mask sensitive information presented on a mobile device using the dynamic privacy policy derived from information relayed via the mobile device sensors arising out of a gyroscope, an accelerometer, proximity, etc. Aspects may provide an efficient way for its users to read sensitive information in a secure manner in places where that information could be more secured than normal. Employing sensor information, with limited or without further input from the user, may benefit productivity and enable users to perform tasks with higher rates of performance or efficiency.

Aspects of the disclosure relate to information presentation management by an electronic presentation device. With respect to a set of information for presentation, a set of information profile data is detected. Using a set of sensors linked to the electronic presentation device, a set of device sensor data of the electronic presentation device is collected. Based on both the set of device sensor data and the set of information profile data, a determination of a security configuration for presentation of the set of information on the electronic presentation device is made. Based on the security configuration, the set of information is presented by the electronic presentation device.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
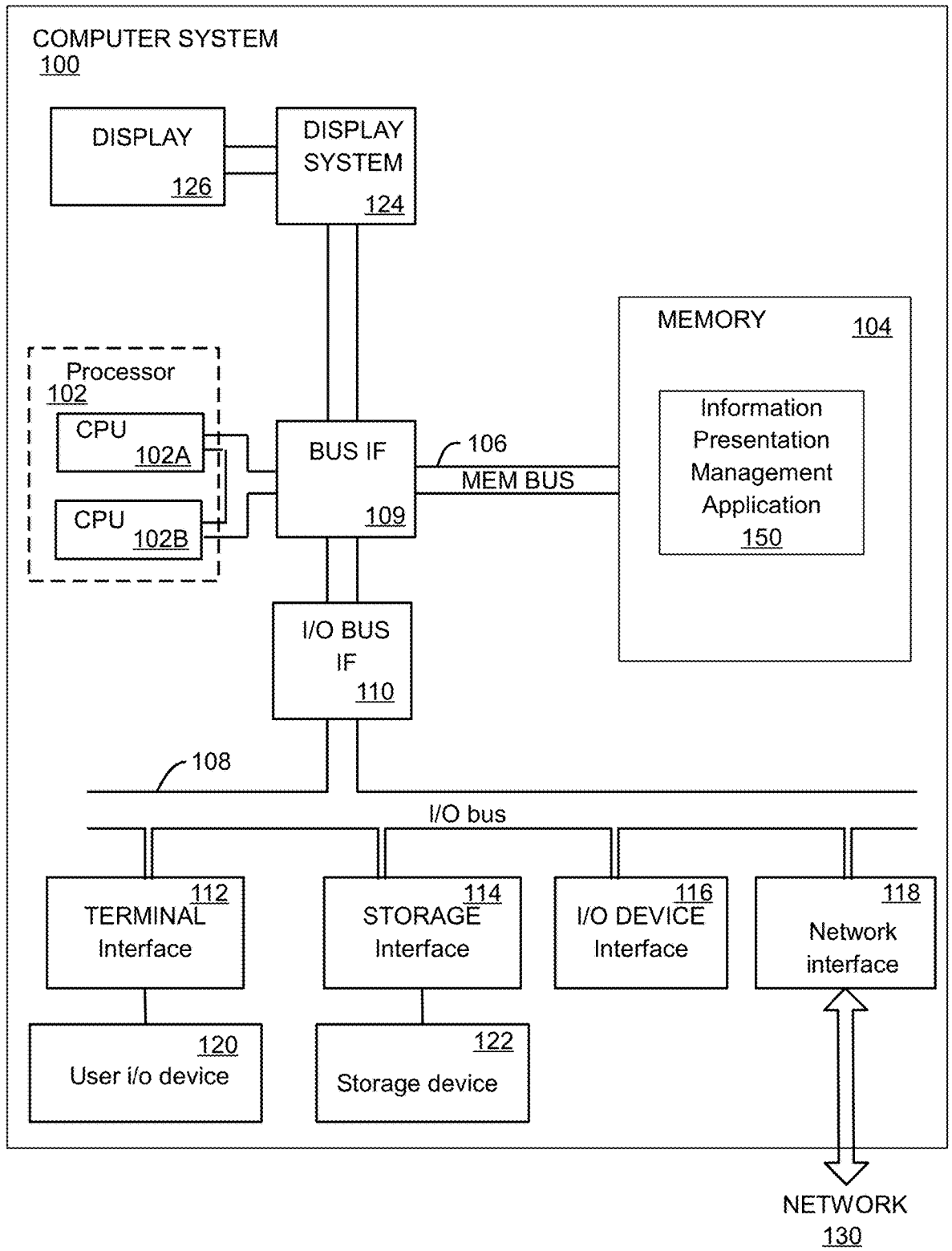
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to configuring a dynamic privacy policy on a mobile device based on information from mobile device sensors. Disclosed aspects may determine when to mask sensitive information presented on a mobile device using the dynamic privacy policy derived from information relayed via the mobile device sensors arising out of a gyroscope, an accelerometer, proximity, etc. Aspects may provide an efficient way for its users to read sensitive information in a secure manner in places where that information could be more secured than normal. Employing sensor information, with limited or without further input from the user, may benefit productivity and enable users to perform tasks with higher rates of performance or efficiency.

Users of information technology systems may be required to handle sensitive information, such as personal identifiable information, other sensitive personal information, and information that is otherwise of a secret, sensitive, or proprietary nature. Mobile devices have become popular platforms for business users to consume and create business information, which may include sensitive information. Such information may be desired to be masked in general, but can be revealed in situations where only the people that should see it are looking at it. For example, a sales person who visits a company may want to price a service based on the sales to that company's competitors. However, since there are people sitting next to him that he does not want to see to what competitors he sold and the prices at which he sold, he may be forced with a dilemma as to whether or not to use his electronic presentation device. As another example, a lawyer may desire to read a document in the train on the way home from work but the document contains sensitive information, which he also needs to see. In the most straightforward way to read it other people could see the information, so it may be desired to be masked. However, perhaps in some places where the user positions the mobile device (e.g., very close to him), aspects described herein may allow him to be able to see the sensitive information.

Aspects of the disclosure include a method, system, and computer program product for information presentation management by an electronic presentation device. With respect to a set of information for presentation, a set of information profile data is detected. Using a set of sensors linked to the electronic presentation device, a set of device sensor data of the electronic presentation device is collected. Based on both the set of device sensor data and the set of information profile data, a determination of a security configuration for presentation of the set of information on the electronic presentation device is made. Based on the security configuration, the set of information is presented by the electronic presentation device.

In embodiments, the set of information profile data includes a set of metadata for the set of information. In embodiments, the set of information profile data indicates a nature of the set of information (e.g., a set of personal identifiable information, a set of sensitive personal information, a set of classified information, a set of proprietary information, a set of export-controlled information). In various embodiments, the set of information profile data includes a set of security parameter values for the set of information (e.g., a set of user-input security parameter values). In embodiments, the set of device sensor data indicates a location of the electronic presentation device. In certain embodiments, the set of device sensor data is derived from a set of gyroscope data, a set of accelerometer data, a set of proximity data, a set of rotation data, or a set of global positioning system data.

In various embodiments, the security configuration indicates to perform an operation such as redact an element of the set of information, mask an element of the set of information, blur an element of the set of information, anonymize an element of the set of information, hide an element of the set of information, mute an element of the set of information, or prevent presentation of an element of the set of information. In various embodiments, the security configuration indicates to perform an operation such as modify a display viewing angle, modify a display color, modify a display brightness, modify a display contrast, modify a display saturation, modify a display temperature, modify a display viewable area, modify a volume level, modify a display language, modify an audio language, or modify an audio tone. Altogether, information presentation management may be associated with performance or efficiency benefits (e.g., data security, application stability, speed, flexibility, load balancing, responsiveness, resource usage, productivity). Aspects may save resources such as bandwidth, processing, or memory.

In various embodiments, a user may utilize aspects described herein by using a mobile device to read, edit, or create documents containing sensitive information. The user can define a privacy policy using aspects described herein based on metadata of the documents, data of the documents, and the mobile device location, local area, and angles. When the user wants to read a document with sensitive information he can configure the area and angles that are safe for showing the unmasked information. When the user is reading, aspects described herein can use the device sensor data from the mobile device sensors to decide whether the current data should be masked. The switch between the view of masked and unmasked data may occur dynamically (e.g., in real-time, on-the-fly) with a device user interface blurring or darkening the document when the switch takes place.

Mobile devices can contain motion detection sensors such as gyroscope, accelerometer, proximity, rotation, global positioning systems, or the like. Mobile operating systems can provide application program interfaces to such features to enable mobile applications that are using those application program interfaces to be aware of the device location, motion, proximity, rotation, etc. With respect to redaction/masking, various software features can be used to analyze document formats including plain text, rich text, forms, graphics, etc. in order to identify sensitive information. Once identified, the information may be redacted, masked, or anonymized and a different version of the document may be generated/saved.

The security configuration (e.g., privacy policy) can include parameters/settings/rules that are based on data from the mobile device sensors, content of information to be presented, or metadata. The configuration of the privacy policy may be done in multiple phases. A first phase may occur when the required information is known to the user. A second phase may occur in the field when the user configures parameters/settings/rules on-the-fly that may or may not be discerned in advance and may use device sensor data from the mobile device motion sensors. The user may configure parameters/settings/rules that, if they are all true, then the user may need to configure the areas and angles that can be used in order to resolve whether to mask the information.

If each of the parameters/settings/rules are known when a user is reading a document, aspects described herein may apply the parameters/settings/rules and perform various operations based on the parameters/settings/rules. However, when the user has configured that the user desires to determine the information on-the-fly on-the-move (e.g., so that when the document is opened a triggering event occurs), aspects described herein may prompt/notify the user that in order to see unmasked version of the document the user may need to configure the areas and angles which may safely present them. In response to the user selecting parameters/settings/rules, aspects described herein may prompt the user with respect to what types of sensitive information that area/angle configurations apply. The process may be repeated again for different type of sensitive information, as appropriate. The user can also save those areas and angles for future usage. Frequently-used areas and angles can be stored as user-defined viewing profiles, such as "On The Train", "At Home", etc.

In order to configure the privacy policy (e.g., when and what data to mask) based on the device motion sensors, the user may position the electronic presentation device in the areas where he wants the data to be masked and also in areas where he does not want the data to be masked. A similar configuration process could also be performed for angles that the user holds the device. The user may define that only in the current location which is taken from the global positioning system (the user could also define a range from the current location), the data may be masked or unmasked. Such aspects may occur in real-time while the user is reading the document. Accordingly, aspects described herein can listen to a global positioning system notification to ascertain if the user is still in the same location and to act based on that information. As such and similarly, the user may configure parameters/settings/rules such that the data can be masked based on the proximity sensors information, and in real-time aspects described herein may listen the notification from the proximity sensor and act accordingly.

The privacy policy may be hierarchical. The user may configure a hierarchy of parameters/settings/rules to check in various orders or weights with respect to using parameters/settings/rules that are based on the mobile device sensors. For example, a user may configure the privacy policy that, by default, indicates that various portions of sensitive information should be masked only if the metadata of a document states that it is related to competitors of a first company and the content includes prices to those competitors. In certain embodiments, when such criteria is met, disclosed aspects may utilize the device sensor data when the electronic presentation device is within a threshold distance of the first company. Accordingly, then aspects described herein may check the data from the proximity sensor to determine if to present the unmasked version of the document.

In embodiments, in real-time for different type of sensitive information, aspects described herein may calculate various areas and angles that that data can be presented unmasked. The invention listens to the sensors data and identifies, according to the area and angle, a specific version of the document that can be presented to the user. For various documents, aspects described herein may listen to the sensors that participate in deciding which version to present for the current document. Aspects of the disclosure may use other tools to match data from the mobile device sensors (e.g., using geo-location information to determine a similarity factor for the location of the user or the electronic presentation device).

Consider the following examples. A sales person which visits to a first company may desire to price a service based on the sales to a competitor of the first company (i.e., a second company). However, there may be people sitting next to him that he does not want to see what competitors he sold to and what were the prices. Accordingly, the user may configure aspects described herein such that if the he reads a document that includes prices and company names, and the metadata states that that document relates to both the first and second companies, then the document may be masked unless the device is in landscape mode (so that less information may be presented in the screen) and only if the proximity sensor recognize that the electronic presentation device is within a threshold distance of his eyes (e.g., within 18 inches). As such, the sales person can be confident that only he is able to see that information while he is trying to sell a service to the first company and can use information that could help him based on sensitive information related to the second company.

As another example, a lawyer may desire to read a document on the train while on the way home. However, the document may include sensitive information which he also needs to see. In a typical way to read it, other people may also see the information. As such, it may be desired to mask at least some data. However, in some places where the user places the mobile device so that only the user can see it, the user may desire to be able to see the sensitive information. The lawyer may use aspects described herein to configure the angles and areas where only he could see the screen of his mobile device. Also, aspects described herein can be configured such that while he reads most of the document (e.g., the non-sensitive portion) he could read it easily in the masked version; however, when the user desires to see the sensitive information the user may position the mobile device in areas and angles where the user configures such that generally only he can see it. As such, aspects described herein may present the sensitive information in certain manners and hide it again when the user returns the device to an easy-to-read position. As such, the user may be able to efficiently read masked information while only the user is able to see the sensitive information.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store an information presentation management application 150. In embodiments, the information presentation management application 150 may include instructions or statements that execute on the processor 102 or instructions or statements that are interpreted by instructions or statements that execute on the processor 102 to carry out the functions as further described below. In certain embodiments, the information presentation management application 150 is implemented in hardware via semiconductor devices, chips, logical gates, circuits, circuit cards, and/or other physical hardware devices in lieu of, or in addition to, a processor-based system. In embodiments, the information presentation management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
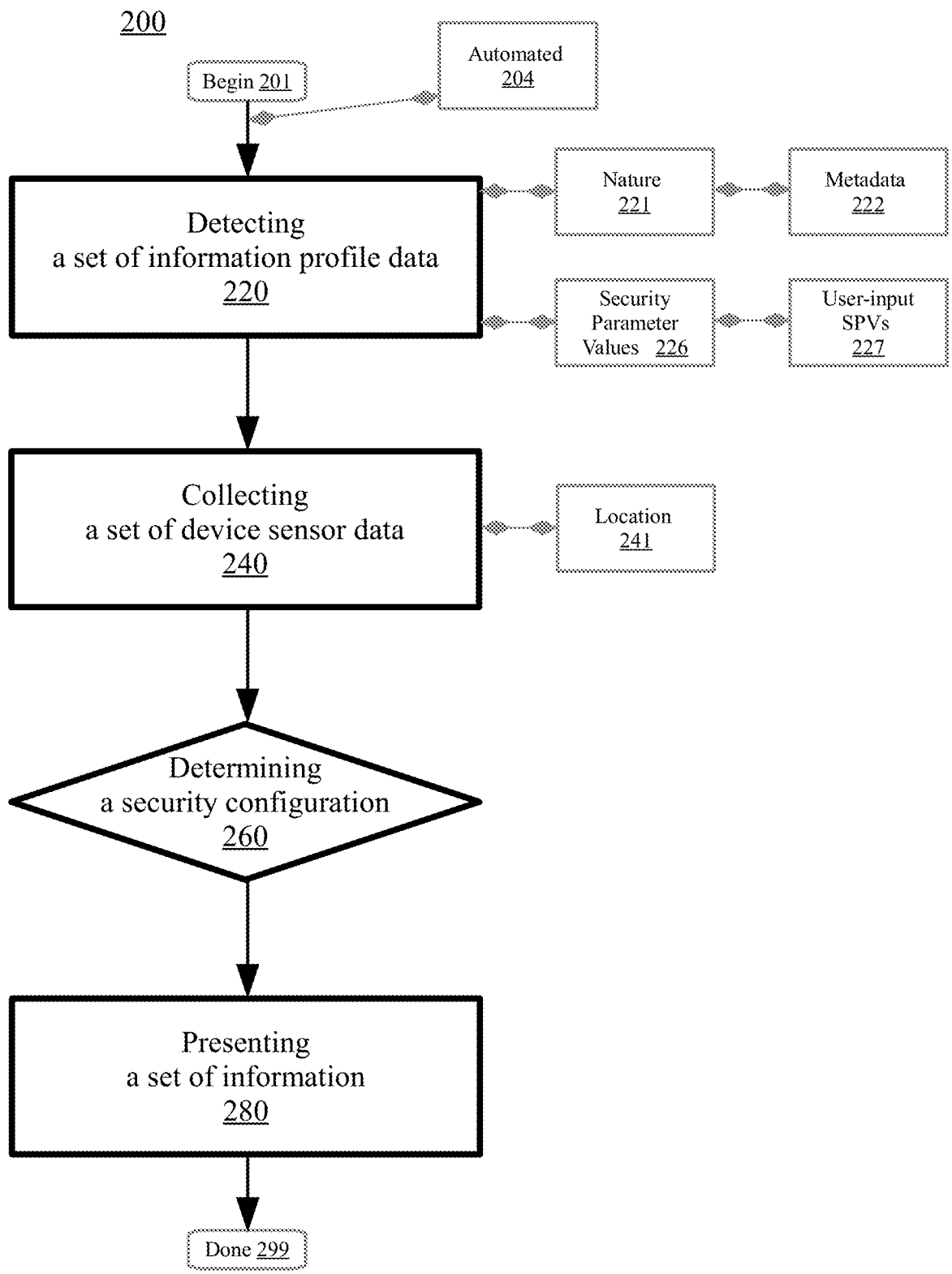
FIG. 2 is a flowchart illustrating a method for information presentation management according to embodiments.

FIG. 2 is a flowchart illustrating a method 200 for information presentation management according to embodiments. The method 200 may begin at block 201. In embodiments at block 204, the operational steps such as the detecting, the collecting, the determining, and the presenting each occur in an automated fashion without user intervention or manual action (e.g., using automated computing machinery, fully machine-driven without manual stimuli). The automated operational steps may be performed by a management engine (e.g., as part of an electronic presentation device).

At block 220, a set of information profile data is detected. The set of profile information is with respect to a set of information for presentation. Detecting can include receiving, sensing, discovering, acquiring, retrieving, or identifying. The presentation can include a provision via transmitting, sending, playing, broadcasting, conveying, displaying, presenting, or publishing. The set of information can include data such as that which can form or include media, still images, video, audio, documents, spreadsheets, charts, programming code, or the like.

The set of profile information can include historical data, random data, predetermined data, user-input data, future/predictive/forecast data, status/state data, resource usage data, or the like for the set of information. In embodiments, the set of information profile data indicates a nature of the set of information at block 221. The nature of the set of information may include a set of personal identifiable information (e.g., biometric information, medical information, personally identifiable financial information, unique identifiers such as passport information, birthdays), a set of sensitive personal information (e.g., childcare information, names/addresses of family members, academic transcripts), a set of classified information (e.g., items meeting federal classification guidelines, items marked classified), a set of proprietary information (e.g., sales metrics, forecast pricing data, trade secrets), a set of export-controlled information (e.g., defense services information, weapons specifications, items marked as potentially export-controlled), or the like. In embodiments, the set of information profile data includes a set of metadata (e.g., codes related to the nature of the set of information, timestamps, usefulness/relevancy indicators, currency/updatedness/outdatedness indicators, file information, size data) for the set of information at block 222.

In embodiments, the set of information profile data includes a set of security parameter values for the set of information at block 226. The set of security parameter values may indicate how to handle, protect, or disseminate various natures/types of information. For example, a security parameter value of "0" may indicate that corresponding data should not be presented, a security parameter value of "1" may indicate that corresponding data should only be presented after receiving a password and fingerprint, a security parameter value of "2" may indicate that corresponding data can be presented after a particular mouse/swipe-motion, a security parameter value, a security parameter value of "9" may indicate that corresponding data can be presented in real-time without further action, etc. In various embodiments, the set of security parameter values for the set of information includes a set of user-input security parameter values at block 227. For example, a user may input/enter the security parameter values such as "0", "1", "2", etc. A user-input security parameter value may override an automated or machine-learned security parameter value. The user-input security parameter value can be required to be selected/input in order to open a file. Users may input/enter the security parameter values during a historical operating system session in a first work environment (e.g., at their office at their desk) and the user-input security parameter values may remain in place for a threshold period of time (e.g., 1 month, 1 year, until explicitly commanded to be expired) such that the user-input security parameter value is active for a current operating system session in a second work environment (e.g., on a commuter train).

At block 240, a set of device sensor data of the electronic presentation device is collected. The set of device sensor data is collected using a set of sensors linked to the electronic presentation device. Collecting can include accumulating, acquiring, aggregating, capturing, gathering, obtaining, logging, monitoring, saving, storing, or the like. The collecting can occur in an on-going (e.g., dynamic, real-time, streamlined, on-the-fly) basis or periodically (e.g., once per day). The set of sensors may be embedded within or as physically part of the electronic presentation device. In certain embodiments, the set of sensors may be externally attached to the electronic presentation device (e.g., when a user leaves the office). The external attachment may be required in order to run various application programs outside of a certain area (e.g., a predetermined location such as within a property perimeter). The set of sensors can include sensors for a direction, orientation, acceleration, velocity, temperature, force, moisture, acoustic, vibration, chemical, position, or the like.

Accordingly, the set of device sensor data may indicate the location to derive a positioning of the electronic presentation device for the purpose of information security. For instance, an orientation of the electronic presentation device or various presentation/display settings/configurations may be utilized for security or information protection purposes (e.g., various configurable viewing angles). The set of device sensor data may be collected/stored in various data structures using one or more devices. For instance, the set of device sensor data may be stored in volatile memory in a format compatible for performing one or more comparisons with another data structure.

The set of device sensor data can include a set of gyroscope data, a set of accelerometer data, a set of proximity data, a set of rotation data, a set of global positioning system data, or the like. In embodiments, the set of device sensor data indicates a location of the electronic presentation device at block 241. For example, the set of device sensor data may indicate the location to derive a relative distance such as a distance of the electronic presentation device with respect to a user, an item (e.g., 5 feet to a watch, 6 inches to glasses, desk) of a user, an area (e.g., within a geo-fenced area by 200 yards, 10 miles to a property line), a competitor (e.g., a competitor's user, 100 feet to a competitor's office, on a competitor's property), or the like.

At block 260, a security configuration is determined. The security configuration is for presentation of the set of information on the electronic presentation device. The determination may be made based on both the set of device sensor data and the set of information profile data. Determining can include ascertaining, identifying, resolving, evaluating, formulating, computing, calculating, comparing, or the like. The security configuration may refer to, describe, or indicate one or more settings or arrangements for utilization to present the set of information with various security or information protection features or operations.

The security configuration can indicate to perform an operation related to the set of information such as to redact an element of the set of information (e.g., black-out a name in a text document), mask an element of the set of information (e.g., conceal a formula related to a chemical composition), blur an element of the set of information (e.g., change an appearance of a face on a still image), anonymize an element of the set of information (e.g., replace a first paragraph of text which indicates a source with a second different paragraph of text without a clear indication of the source), hide an element of the set of information (e.g., columns of a spreadsheet no longer appear in view), mute an element of the set of information (e.g., a particular voice from audio data is not played while one or more other voices are played), prevent presentation of an element of the set of information (e.g., disallow an opening of a linked file such as a certain video), or the like. Accordingly, various identifiers, values, or codes may map with such operations (e.g., "0" maps to redacting, "1" maps to masking, "2" maps to blurring). A combination of operations on one or more elements may positively impact information security/protection.

The security configuration can indicate to perform an operation related to a method/mode of the presentation such as to modify a display viewing angle, modify a display color, modify a display brightness, modify a display contrast, modify a display saturation, modify a display temperature, modify a display viewable area, modify a volume level, modify a display language, modify an audio language, modify an audio tone, or the like. Accordingly, various identifiers, values, or codes may map with such operations (e.g., "A" maps to a first viewing angle, "B" maps to a second viewing angle, "C" maps to a viewable area). One or more modifications may be used at a given time. Combinations of various operations can yield, for example, a determination of a security configuration in order to modify a display angle while also blurring one or more elements to achieve benefits with respect to information protection or security.

At block 280, the set of information is presented by the electronic presentation device based on the security configuration. Presenting can include providing, transmitting, sending, broadcasting, playing, conveying, displaying, messaging, publishing, or the like. The electronic presentation device may include a computer, a monitor, or the like. For example, the electronic presentation device can include a mobile display device, a smartphone, a smartwatch, a watch, a tablet, a personal computer, a laptop, a television, a speaker, a projector, a personal digital assistant, or the like. The electronic presentation device may access the security configuration in response to a request to present the set of information. The security configuration may be tailored/configured specifically for the set of information, for the specific electronic device, or a combination thereof. For example, based on the security configuration, an output of audio may be different using concert speakers versus a cell phone speaker. Similarly, based on the security configuration, an electronic billboard may present a message differently than a personal digital assistant.

Method 200 concludes at block 299. Aspects of method 200 may provide performance or efficiency benefits with respect to information presentation management. For example, aspects of method 200 may include positive impacts on information protection, security, resource usage, speed, or productivity with respect to information presentation management. In embodiments, performance or efficiency benefits when using an electronic presentation device to present a set of information may occur (e.g., speed, flexibility, load balancing, responsiveness, productivity, security).

Figure 3:
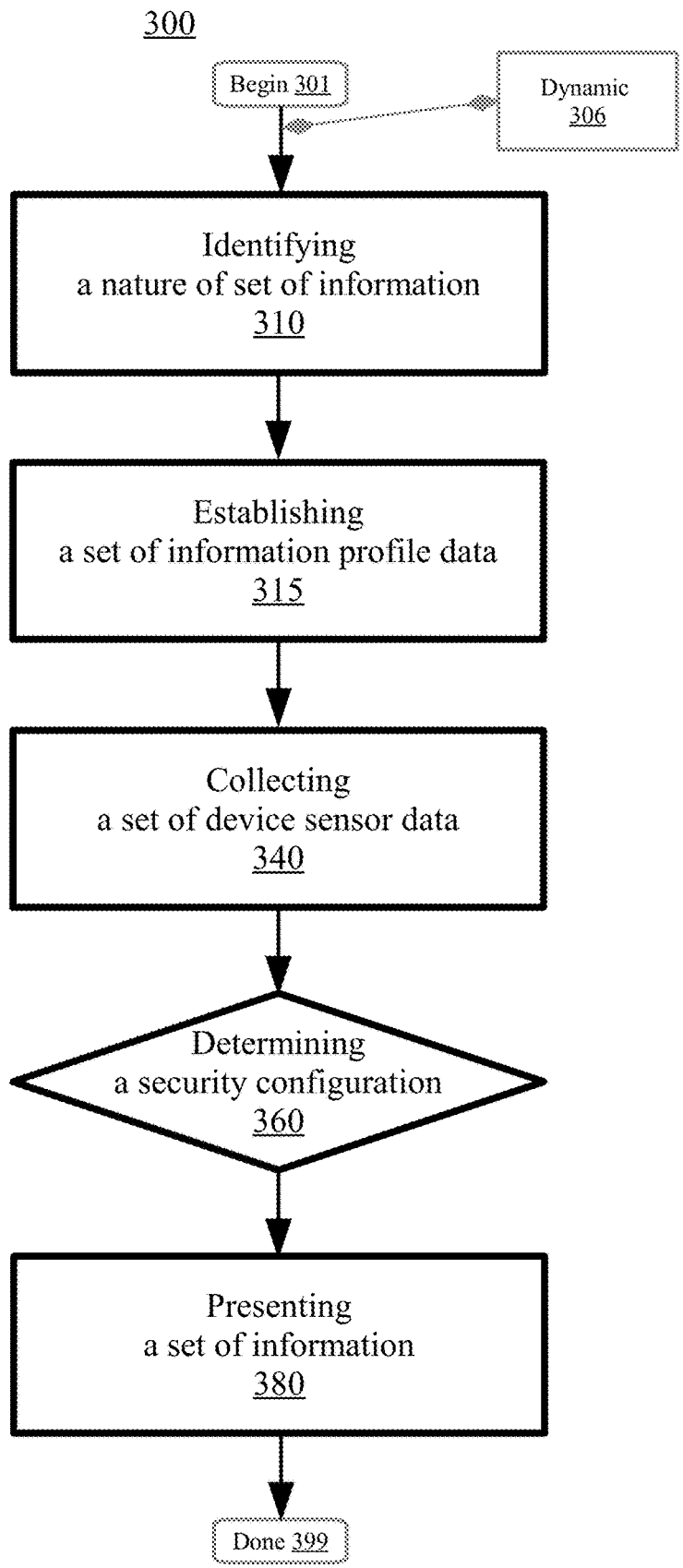
FIG. 3 is a flowchart illustrating a method for information presentation management according to embodiments.

FIG. 3 is a flowchart illustrating a method 300 for information presentation management according to embodiments. Aspects of method 300 may be similar or the same as aspects of method 200 and aspects may be utilized with other methodologies described herein (e.g., method 400, method 500, method 600). The method 300 may begin at block 301. In embodiments at block 306, at least a portion of the operational steps including the collecting, the determining, and the presenting occur in a dynamic fashion. Accordingly, such operational steps may occur in real-time (e.g., streamlined, on-the-fly, ongoing). For example, device sensor data may be collected and a security configuration may be determined on-the-fly in order to streamline presentation of the set of information.

At block 310, the nature (e.g., type, typology, kind, category, character) of the set of information may be identified. The nature of the set of information can be identified in an automated fashion. The automated fashion may occur without user intervention or manual action (e.g., using automated computing machinery, fully machine-driven without manual stimuli) and may be performed by a management engine (e.g., as part of an electronic presentation device). Identifying can include determining, ascertaining, analyzing, sensing, recognizing, or the like. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use. Based on the nature of the set of information, the set of information profile data may be established at block 315. Establishing can include creating, generating, compiling, structuring, constructing, assembling, outputting, forming, organizing, storing, saving, or the like. The nature of the set of information may be identified and established on/by the electronic presentation device or via a communication with a cloud server as a software service.

Using a set of sensors linked to the electronic presentation device, a set of device sensor data of the electronic presentation device is collected at block 340. Based on both the set of device sensor data and the set of information profile data, a determination of a security configuration for presentation of the set of information on the electronic presentation device is made at block 360. Based on the security configuration, the set of information is presented by the electronic presentation device at block 380.

Method 300 concludes at block 399. Aspects of method 300 may provide performance or efficiency benefits with respect to information presentation management. For example, aspects of method 300 may include positive impacts on information protection, security, resource usage, speed, or productivity with respect to information presentation management. In embodiments, performance or efficiency benefits when using an electronic presentation device to present a set of information may occur (e.g., speed, flexibility, load balancing, responsiveness, productivity, security).

Figure 4:
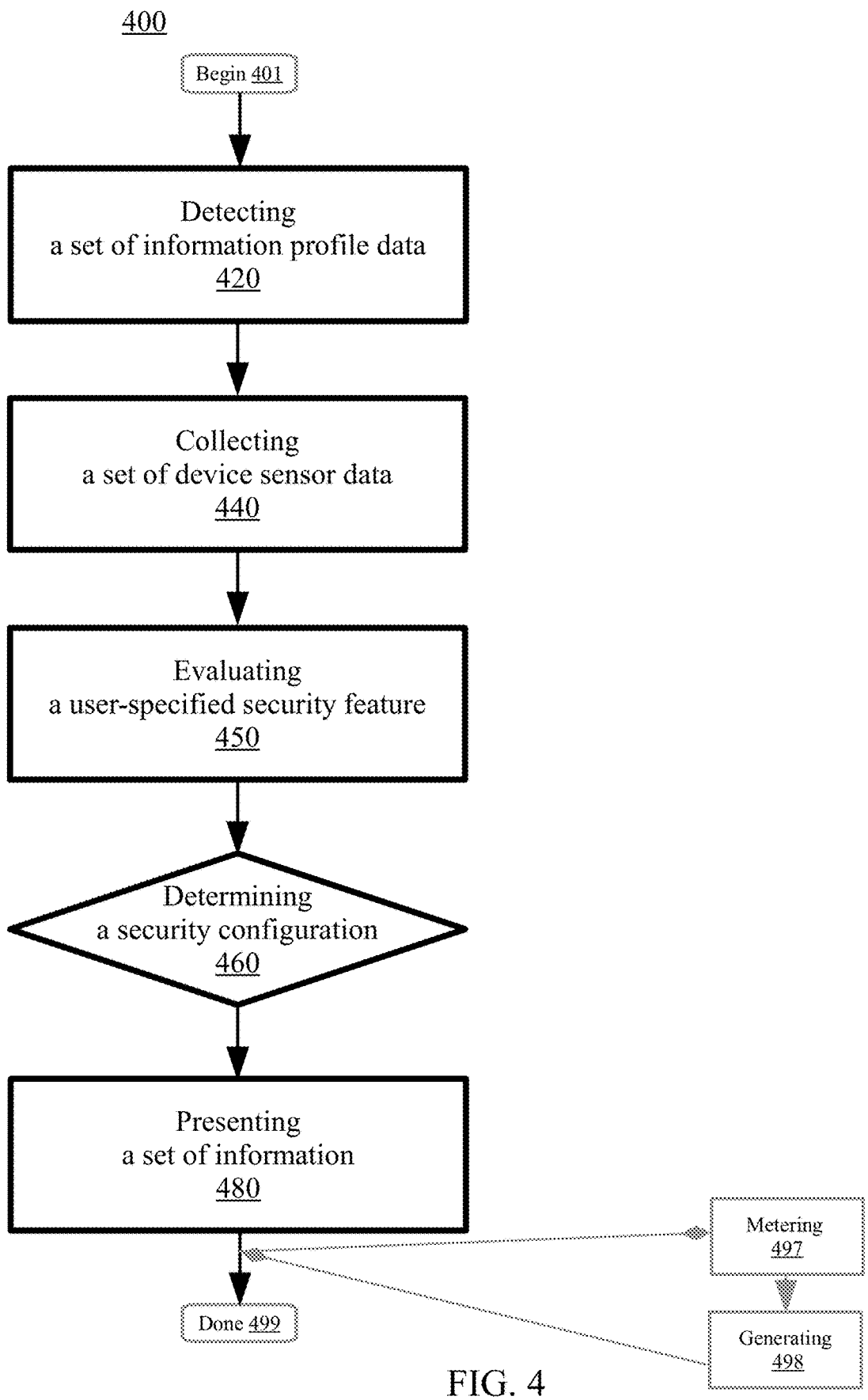
FIG. 4 is a flowchart illustrating a method for information presentation management according to embodiments.

FIG. 4 is a flowchart illustrating a method 400 for information presentation management according to embodiments. Aspects of method 400 may be similar or the same as aspects of method 200 and aspects may be utilized with other methodologies described herein (e.g., method 300, method 500, method 600). The method 400 may begin at block 401. With respect to a set of information for presentation, a set of information profile data is detected at block 420. Using a set of sensors linked to the electronic presentation device, a set of device sensor data of the electronic presentation device is collected at block 440.

Based on both the set of device sensor data and the set of information profile data, a determination of a security configuration for presentation of the set of information on the electronic presentation device is made at block 460. To determine the security configuration, a user-specified security feature may be evaluated for the nature of the set of information and the set of device sensor data at block 450. Evaluating can include formulating, computing, calculating, comparing, appraising, or the like. The user-specified security feature may include a selection of one or more security configurations. Such user-specified security features may override, complement, or be moot with respect to the security configuration. For example, when a user-specified security feature is at a higher-level of security than a default, computer generated, or machine-learned (e.g., via historical usage data) security configuration, the higher-level of security may prevail for use when performing the presentation. The user-specified security feature may supplement or complement configurations already being utilized by the electronic presentation device (e.g., in addition to modifying the viewing angle also blur certain words). Based on the security configuration, the set of information is presented by the electronic presentation device at block 480.

In embodiments, a usage assessment may be generated with respect to the information presentation management. Use of the information presentation management by the electronic presentation device may be metered at block 497. For example, service-life extensions may be measured, security benefits, or functional up-time relative to a benchmark (e.g., historical functional up-time, historical comparison of security events) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 498. The generated invoice may be provided (e.g., displayed in a dialog box, sent or transferred by e-mail, text message, initiated for traditional mail) to the user for notification, acknowledgment, or payment.

Method 400 concludes at block 499. Aspects of method 400 may provide performance or efficiency benefits with respect to information presentation management. For example, aspects of method 400 may include positive impacts on information protection, security, resource usage, speed, or productivity with respect to information presentation management. In embodiments, performance or efficiency benefits when using an electronic presentation device to present a set of information may occur (e.g., speed, flexibility, load balancing, responsiveness, productivity, security).

Figure 5:
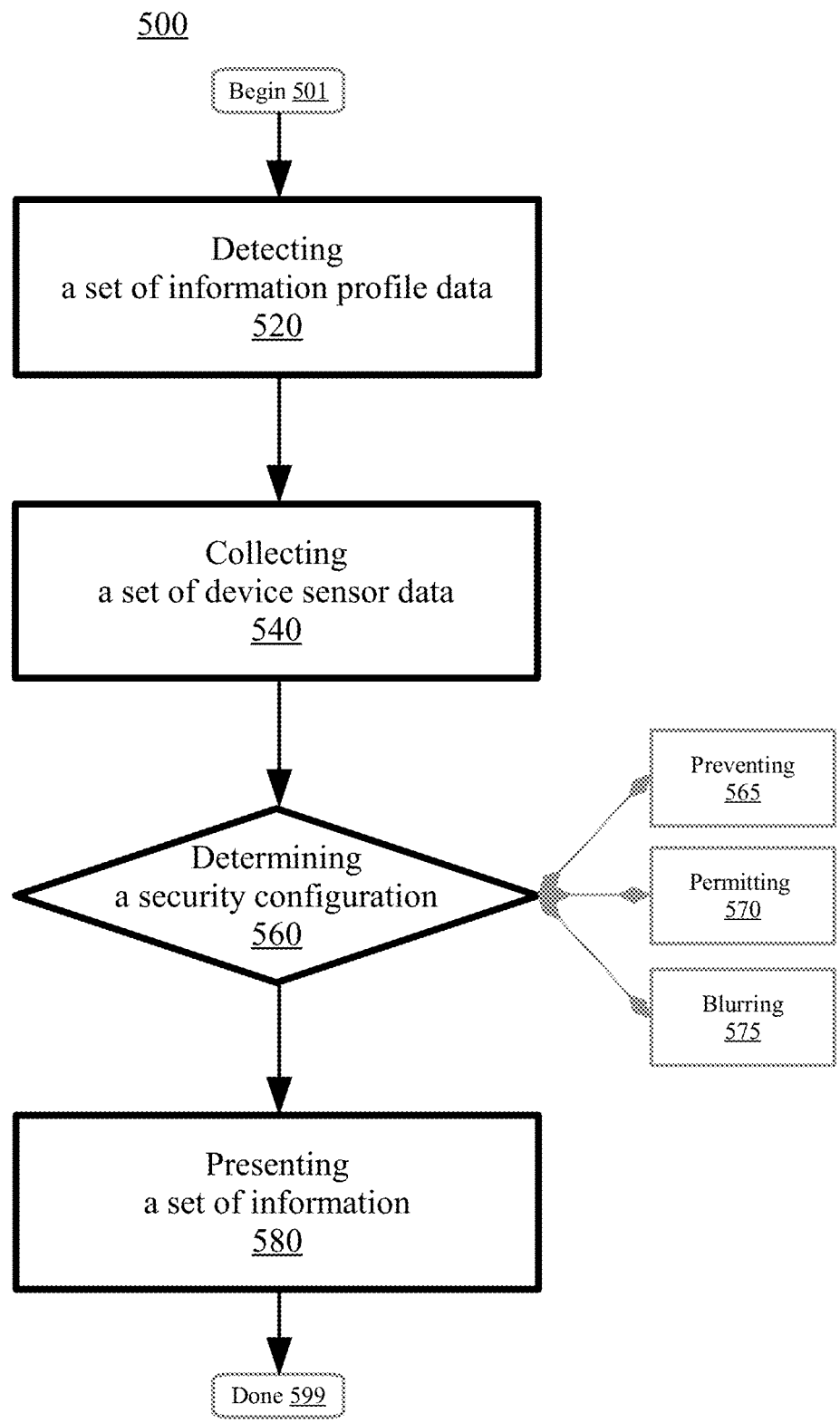
FIG. 5 is a flowchart illustrating a method for information presentation management according to embodiments.

FIG. 5 is a flowchart illustrating a method 500 for information presentation management according to embodiments. Aspects of method 500 may be similar or the same as aspects of method 200 and aspects may be utilized with other methodologies described herein (e.g., method 300, method 400, method 600). The method 500 may begin at block 501. With respect to a set of information for presentation, a set of information profile data is detected at block 520. Using a set of sensors linked to the electronic presentation device, a set of device sensor data of the electronic presentation device is collected at block 540.

Based on both the set of device sensor data and the set of information profile data, a determination of a security configuration for presentation of the set of information on the electronic presentation device is made at block 560. The security configuration may include preventing (e.g., disabling, disallowing, prohibiting, blocking, disregarding, suppressing, ignoring, precluding, or at least deterring) presentation of classified (e.g., secret, top-secret) information on the electronic presentation device at block 565, permitting (e.g., allowing) presentation of export-controlled information (e.g., marked as "ITAR") only in a home country (e.g., United States) in meetings of authorized home country residents (e.g., citizens, lawful permanent residents) at block 570, and blurring proprietary (e.g., detailed new widget specifications) information at block 575. Based on the security configuration, the set of information is presented by the electronic presentation device at block 580.

Method 500 concludes at block 599. Aspects of method 500 may provide performance or efficiency benefits with respect to information presentation management. For example, aspects of method 500 may include positive impacts on information protection, security, resource usage, speed, or productivity with respect to information presentation management. In embodiments, performance or efficiency benefits when using an electronic presentation device to present a set of information may occur (e.g., speed, flexibility, load balancing, responsiveness, productivity, security).

Figure 6:
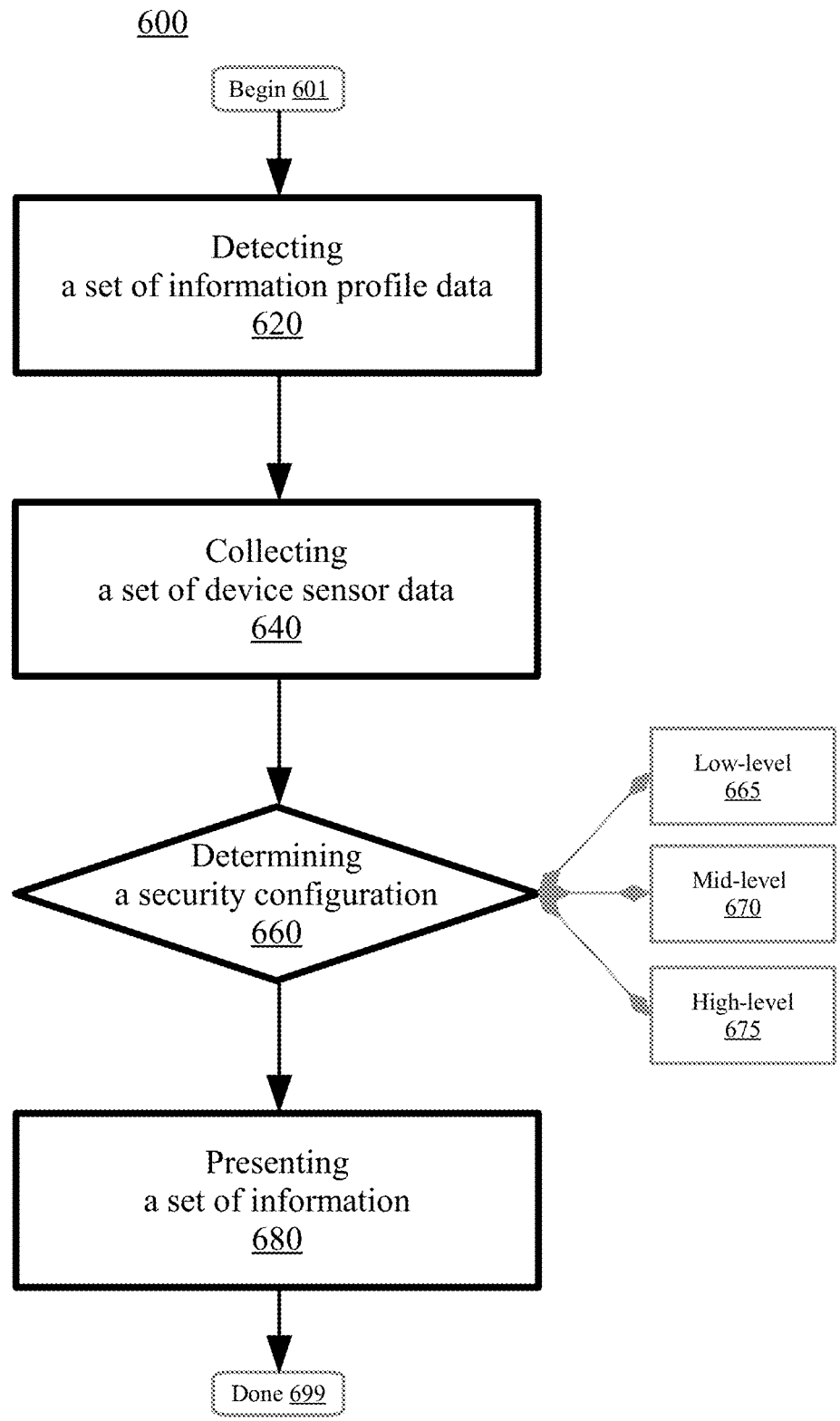
FIG. 6 is a flowchart illustrating a method for information presentation management according to embodiments.

FIG. 6 is a flowchart illustrating a method 600 for information presentation management according to embodiments. Aspects of method 600 may be similar or the same as aspects of method 200 and aspects may be utilized with other methodologies described herein (e.g., method 300, method 400, method 500). The method 600 may begin at block 601. With respect to a set of information for presentation, a set of information profile data is detected at block 620. Using a set of sensors linked to the electronic presentation device, a set of device sensor data of the electronic presentation device is collected at block 640.

Based on both the set of device sensor data and the set of information profile data, a determination of a security configuration for presentation of the set of information on the electronic presentation device is made at block 660. The security configuration may include configuring a security parameter value to low-level security (e.g., parameter value below a threshold) at a normal office (e.g., based on a connection with a docking station) on a desk at block 665, configuring the security parameter value to mid-level security (e.g., parameter value within a threshold range) in a transportation environment within a threshold distance of a user (e.g., on a bus when within ten feet of the user) at block 670, and configuring the security parameter value to high-level security (e.g., parameter value that exceeds a threshold) in a conference room having non-co-workers (e.g., individuals present without company security badges) at block 675. Based on the security configuration, the set of information is presented by the electronic presentation device at block 680.

Method 600 concludes at block 699. Aspects of method 600 may provide performance or efficiency benefits with respect to information presentation management. For example, aspects of method 600 may include positive impacts on information protection, security, resource usage, speed, or productivity with respect to information presentation management. In embodiments, performance or efficiency benefits when using an electronic presentation device to present a set of information may occur (e.g., speed, flexibility, load balancing, responsiveness, productivity, security).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for information presentation management by an electronic presentation device, the method comprising:
    detecting a set of information profile data with respect to a set of information for presentation;
    collecting, using a set of sensors linked to the electronic presentation device, a set of device sensor data of the electronic presentation device, the set of sensors comprising at least one motion sensor, proximity sensor, and rotation sensor;
    determining, based on both the set of device sensor data and the set of information profile data, a security configuration for presentation of the set of information on the electronic presentation device, wherein the security configuration is hierarchical and comprises at least one configurable display viewable area and at least one configurable display viewing angle relative to the electronic presentation device;
    based on the determined security configuration, dynamically prompting a user to configure the at least one configurable display viewable area and the at least one configurable display viewing angle relative to the electronic presentation device; and
    presenting, on the electronic presentation device, a version of the set of information based, in part, on the at least one configurable display viewable area, the at least one configurable display viewing angle, and the set of device sensor data.

2. The method of claim 1, wherein the set of information profile data indicates a nature of the set of information.

3. The method of claim 2, wherein the set of information profile data includes a set of metadata for the set of information.

4. The method of claim 2, wherein the nature of the set of information is selected from the group consisting of:
    a set of personal identifiable information,
    a set of sensitive personal information,
    a set of classified information,
    a set of proprietary information, and
    a set of export-controlled information.

5. The method of claim 2, further comprising:
    identifying, in an automated fashion, the nature of the set of information; and
    establishing, based on the nature of the set of information, the set of information profile data.

6. The method of claim 2, wherein determining, based on both the set of device sensor data and the set of information profile data, the security configuration for presentation of the set of information on the electronic presentation device includes:
    evaluating, to determine the security configuration, a user-specified security feature for the nature of the set of information and the set of device sensor data.

7. The method of claim 2, wherein the security configuration includes:
    preventing presentation of classified information on the electronic presentation device;
    permitting presentation of export-controlled information only in a home country; and
    blurring proprietary information.

8. The method of claim 2, wherein the security configuration includes:
    configuring a security parameter value to low-level security at an office desk identified based on a connection with a docking station;
    configuring the security parameter value to mid-level security in an environment within a threshold distance of a user; and
    configuring the security parameter value to high-level security in a conference room.

9. The method of claim 1, wherein the set of information profile data includes a set of security parameter values for the set of information.

10. The method of claim 9, wherein the set of security parameter values for the set of information includes a set of user-input security parameter values.

11. The method of claim 1, wherein the set of device sensor data indicates a location of the electronic presentation device.

12. The method of claim 11, wherein the set of device sensor data is selected from the group consisting of:
- a set of gyroscope data,
- a set of accelerometer data,
- a set of proximity data,
- a set of rotation data, and
- a set of global positioning system data.

13. The method of claim 1, wherein the security configuration indicates to perform an operation selected from the group consisting of:
- redact an element of the set of information,
- mask an element of the set of information,
- blur an element of the set of information,
- anonymize an element of the set of information,
- hide an element of the set of information,
- mute an element of the set of information, and
- prevent presentation of an element of the set of information.

14. The method of claim 1, wherein the security configuration indicates to perform an operation selected from the group consisting of:
- modify a display viewing angle,
- modify a display color,
- modify a display brightness,
- modify a display contrast,
- modify a display saturation,
- modify a display temperature,
- modify a display viewable area,
- modify a volume level,
- modify a display language,
- modify an audio language, and
- modify an audio tone.

15. The method of claim 1, wherein the collecting, the determining, and the presenting occur in a dynamic fashion.

16. The method of claim 1, wherein the detecting, the collecting, the determining, and the presenting each occur in an automated fashion without user intervention.

17. The method of claim 1, further comprising:
- metering use of the information presentation management; and
- generating an invoice based on the metered use.

18. A system for information presentation management by an electronic presentation device, the system comprising:
- a memory having a set of computer readable computer instructions, and
- a processor for executing the set of computer readable instructions, the set of computer readable instructions including:
  - detecting a set of information profile data with respect to a set of information for presentation;
  - collecting, using a set of sensors linked to the electronic presentation device, a set of device sensor data of the electronic presentation device, the set of sensors comprising at least one motion sensor, proximity sensor, and rotation sensor;
  - determining, based on both the set of device sensor data and the set of information profile data, a security configuration for presentation of the set of information on the electronic presentation device, wherein the security configuration is hierarchical and comprises at least one configurable display viewable area and at least one configurable display viewing angle relative to the electronic presentation device;
  - based on the determined security configuration, dynamically prompting a user to configure the at least one configurable display viewable area and the at least one configurable display viewing angle relative to the electronic presentation device; and
  - presenting, on the electronic presentation device, a version of the set of information based, in part, on the at least one configurable display viewable area, the at least one configurable display viewing angle, and the set of device sensor data.

19. A computer program product for information presentation management by an electronic presentation device, the computer program product comprising a computer readable storage medium having program instructions embodied therewith, wherein the computer readable storage medium is not a transitory signal per se, the program instructions executable by a processor to cause the processor to perform a method comprising:
- detecting a set of information profile data with respect to a set of information for presentation;
- collecting, using a set of sensors linked to the electronic presentation device, a set of device sensor data of the electronic presentation device, the set of sensors comprising at least one motion sensor, proximity sensor, and rotation sensor;
- determining, based on both the set of device sensor data and the set of information profile data, a security configuration for presentation of the set of information on the electronic presentation device, wherein the security configuration is hierarchical and comprises at least one configurable display viewable area and at least one configurable display viewing angle relative to the electronic presentation device;
- based on the determined security configuration, dynamically prompting a user to configure the at least one configurable display viewable area and the at least one configurable display viewing angle relative to the electronic presentation device; and
- presenting, on the electronic presentation device, a version of the set of information based, in part, on the at least one configurable display viewable area, the at least one configurable display viewing angle, and the set of device sensor data.

20. The computer program product of claim 19, wherein at least one of:
- the program instructions are stored in the computer readable storage medium in a data processing system, and wherein the program instructions were downloaded over a network from a remote data processing system; or
- the program instructions are stored in the computer readable storage medium in a server data processing system, and wherein the program instructions are downloaded over a network to the remote data processing system for use in a second computer readable storage medium with the remote data processing system.

* * * * *